April 18, 1944.  L. J. HARRISS ET AL  2,346,839
BAKING UTENSIL
Filed March 27, 1941  2 Sheets-Sheet 1

INVENTORS.
Lloyd J. Harriss
Bernard Lambers
BY
Attys.

April 18, 1944.   L. J. HARRISS ET AL   2,346,839
BAKING UTENSIL
Filed March 27, 1941   2 Sheets-Sheet 2
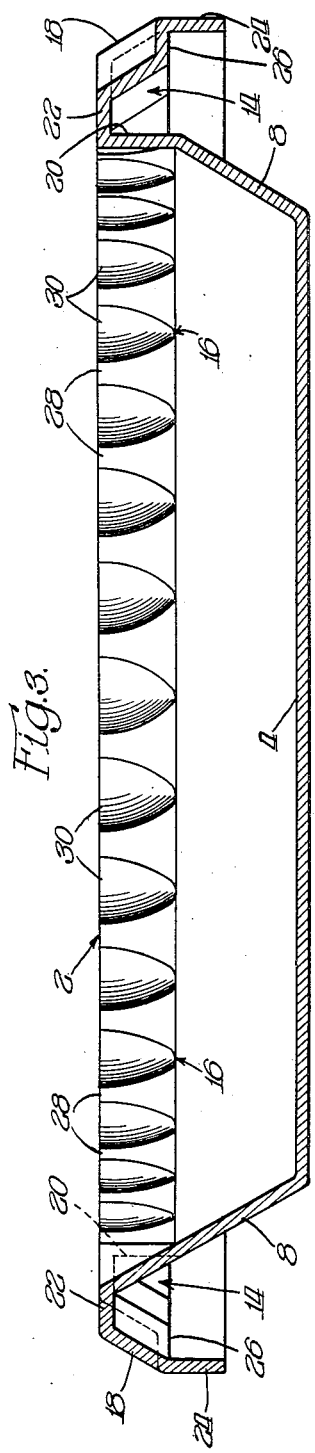
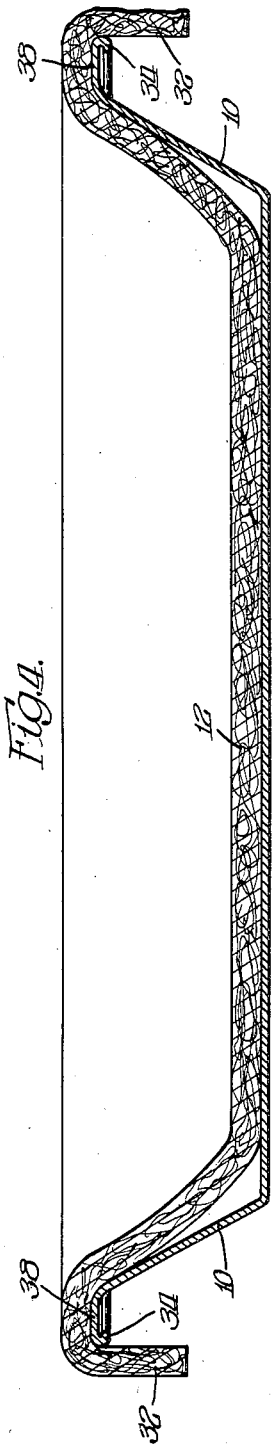
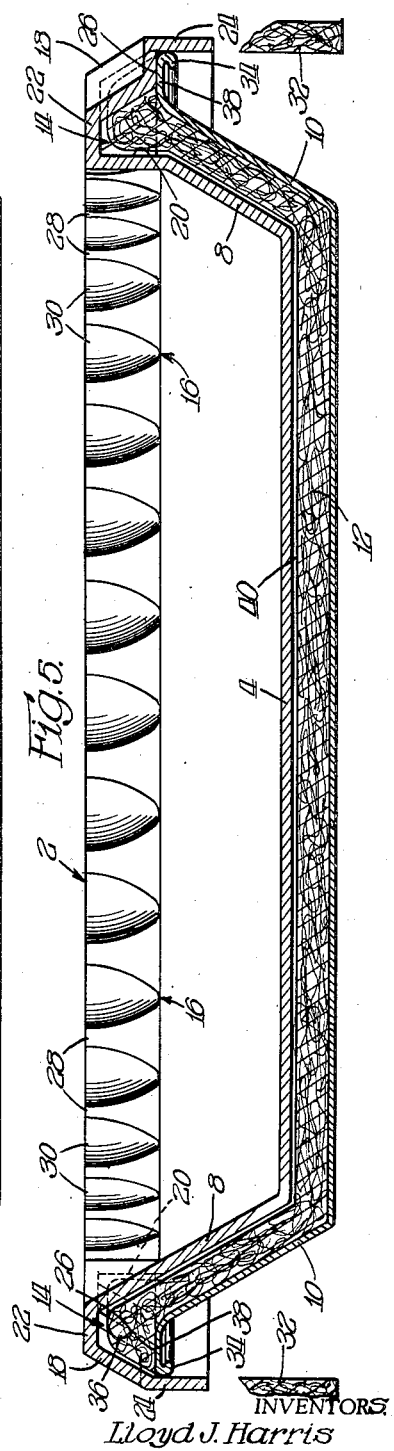
INVENTORS
Lloyd J. Harris
Bernard Lambers
BY
Attys.

Patented Apr. 18, 1944

2,346,839

UNITED STATES PATENT OFFICE 2,346,839

BAKING UTENSIL

Lloyd J. Harriss, Kenilworth, and Bernard Lambers, Oak Park, Ill.; said Lambers assignor to said Harriss Application March 27, 1941, Serial No. 385,418

4 Claims. (Cl. 99—439)

This invention relates to a new and improved method of baking pies and to a new and improved utensil therefor.

The invention is especially concerned with making pre-baked pie shells, or crusts, that is to say, pie shells or crusts which are adapted to receive a filling after they are baked as distinguished from those types of pies in which the filling is placed in the unbaked pie crust or dough and both the filling and the pie crust baked simultaneously.

One difficulty heretofore in making pre-baked pie shells has been the lack of uniformity of the pie shell. The result has been an unattractive appearance which has left much to be desired, particularly in making pies for sale to retail purchasers. One method commonly resorted to in order to produce a pre-baked pie shell is to invert an ordinary pie pan and place a rolled unbaked crust over the inverted pan and bake it, with or without placing another pie pan over the unbaked crust. Although this method can be used, it is relatively unsatisfactory to bake the shell in an inverted position. The dough shortening melts and runs during baking and when the pie shell is inverted it will run down around the inverted mouth of the shell. Furthermore, the crust will often puff or blister. Hence, this method does not lend itself readily to the preparation of a pre-baked pie shell having a crimped edge and uniform results are very difficult to obtain.

One of the objects of the present invention is to provide a new and improved type of pre-baked pie shell having a crimped edge around the mouth or upper peripheral portion thereof.

Another object of the invention is to provide a new and improved pre-baked pie shell characterized by a substantially uniform and attractive appearance.

Still another object of the invention is to provide a new and improved type of bakery utensil particularly adapted to be used in conjunction with an ordinary pie pan in its normal position to make pre-baked pie shells having a uniform and attractive appearance.

An additional object of the invention is to provide a new and improved method for making pre-baked pie shells.

Other objects and advantages of the invention will be apparent by reference to the following description in conjunction with the accompanying drawings, in which:

Figure 3 is a cross-sectional view taken along the line 3—3 of Figure 1;

Figure 4 is a cross-sectional view of an unbaked pie crust disposed in an ordinary or conventional pie pan in a manner suitable for assembly with the baking utensil shown in Figure 3;

Figure 5 shows the baking utensil of Figure 3 assembled in superposed relationship with the pie crust and pie pan of Figure 4 just prior to baking.

Figure 1:
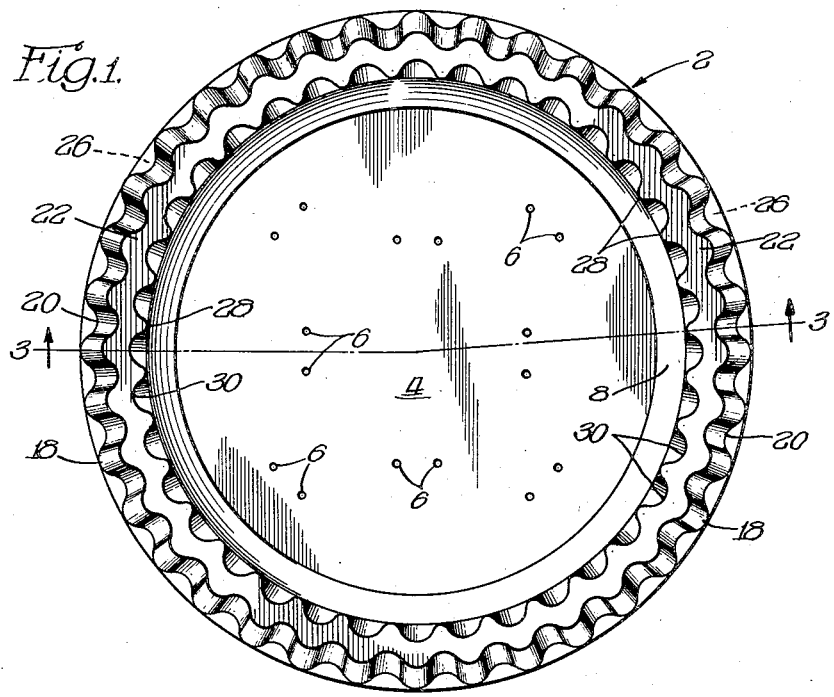
Figure 1 illustrates a plan view of a preferred type of bakery utensil provided in accordance with the invention.
Figure 2:
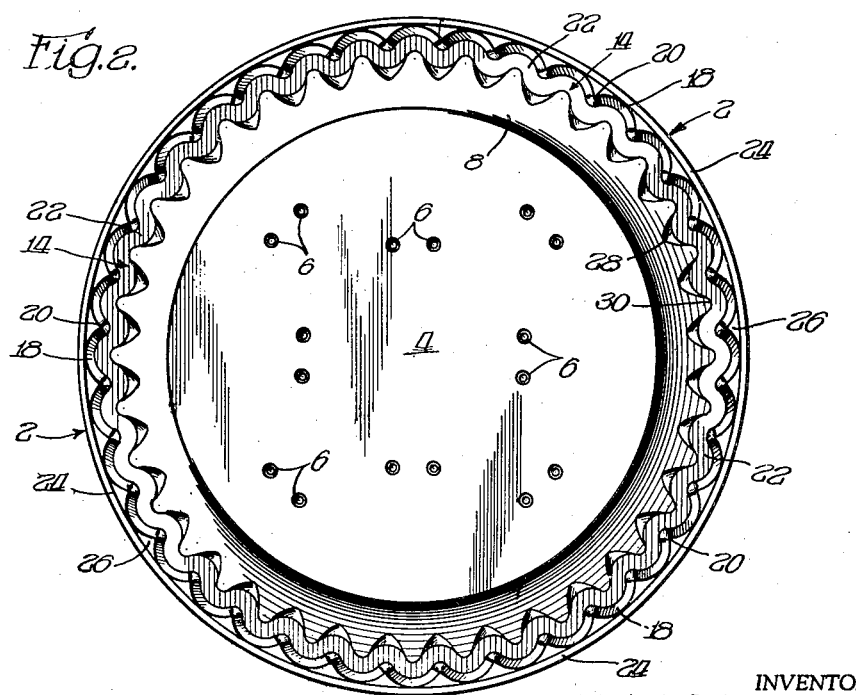
Figure 2 illustrates a bottom plan view of the utensil shown in Figure 1.

As illustrated in Figures 1, 2 and 3, the baking utensil 2 comprises a bottom portion 4 preferably provided with holes 6. The side wall 8 of the utensil 2 is generally slanting or oblique to the bottom 4 in the same manner as the ordinary pie pan 10, shown in Figure 4. It will be observed from Figure 5 that the utensil 2 is so constructed as to fit within the pie pan 10, leaving enough space therebetween for the crust or pie dough 12.

As shown in Figures 1, 2, and 3, the wall 8 of the utensil 2 intersects at the upper end with a crimping area 14. The crimping area 14 is bounded by a series of crimping elements 16 which are formed by a series of projecting areas 18 alternating with a series of recessed areas 20.

The upper part of the crimping area is formed by a side 22, as shown in Figure 3, which may be either polygonal, as shown, round, or any other desired configuration. Depending from the edge or outer periphery of the utensil is a flange 24 which is integral with the crimping element 16. It will be observed that the structure of the utensil is such as to form a seating area 26 which bottoms on the top of the dough or on the top of the pie pan. It will further be observed that the projections and recesses which define the crimping area occur not only on the outside of the vessel but also on the inside, as shown in Figures 1 and 3. Thus, the recess 20 in Figure 1, has a complementary inner projection 28 and the outer projection 18 has a complementary inner recess 30. In this manner it is possible to construct the utensil so that the cross-sectional area throughout is substantially uniform, thereby providing for a uniform temperature throughout the crimped area of the pie shell during the baking process. As will be observed from Figure 2, the construction of the utensil is preferably such that the crimping area 14 has the appearance of a sinuous passage. This passage is bounded on its outer side by a series of outwardly projecting sloping elements 18 separated from each other by a series of inwardly projecting sloping elements 20, and on the other side by a series of outwardly projecting sloping elements 30 separated from each other by a series of inwardly projecting sloping elements 28. It will be observed that the inwardly projecting elements 20 and 28 are generally complemental and that the same is true of the outwardly projecting elements 18 and 30. The flange or peripheral element 24 acts as a cutting edge to sever and remove the edges of the dough.

The manner of using the baking utensil may be described briefly as follows. A sheet of dough or unbaked pie crust 12 is placed over an ordinary pie pan 10 with its edges 32 hanging over the edges 34 of the pie pan in the manner shown in Figure 4. The baking utensil 2 shown in Figures 1, 2 and 3 is then superposed upon the pie pan 10 containing the dough or crust 12. As this occurs the excess or surplus dough is trimmed off and removed in the manner shown in Figure 5. At the same time, that portion of the dough adjacent the rim 34 of the pie pan is squeezed inwardly and upwardly by the crimping area 14 to produce a crimp or bead 36 around the upper edge of the pie crust. This is made possible by the fact that the descending element 18 pressing against the portion of the dough above the rim of the pie pan 10 tends to press the dough inwardly. Since the dough is confined on all other sides, it is also pressed upwardly at the same time. Thus, there is imparted to the dough the general shape shown in Figure 5. The seating portion 26 of the utensil 2 is pressed downwardly against the top of the pie pan 38 and this also tends to crowd the dough inwardly and upwardly. The baking utensil 2 is preferably so constructed with respect to the position of the seating portion 26 as to leave an unoccupied space or area 40 between the dough 12 and the bottom 4 of the utensil 2, as shown in Figure 5. This space may be varied to suit any given requirements but should preferably be on the order of about 1/64 of an inch.

The crust 12 is baked by placing the assembly 5 in an oven or by subjecting it to heat in any known and convenient manner. The baking utensil 2 is allowed to remain in place in superposed relationship with the pie crust 12 and the pie pan 10 during the baking process. In this way a uniform heat is applied both to the top and the bottom of the pie crust. As the pie crust is baked the clearance space 40 is filled by the expanding crust. After the baking is completed, the utensil 2 is removed from the assembled pie crust 10 and pie pan 12. The pre-baked pie crust may then be filled with a filling material in any well known manner and sold as such in the pie pan, or it may be removed from the pie pan and placed in some other type of supporting container. During the baking process any vapors or gases generated are permitted to escape through the holes 6 in the bottom 4 of the baking utensil 2 as shown in Figures 1 and 2.

It will be observed that the peripheral flange around the top of the baking utensil 2 which forms the channel, groove or passageway 14 preferably has the general cross-sectional shape or configuration of an inverted U, although this shape varies somewhat. Thus, as shown, the inner wall 20 of the flange or groove varies from an oblique direction to a vertical direction and vice versa. The resultant effect is to produce a crimp or bead extending well down into the hollow pie shell on the interior thereof, as well as a raised bead on top of the pie shell. It will further be observed that the seating portion 26 is an integral extension connecting the bottom or lower edge of the exterior wall of the flange 18 with the cutting or trimming portion 24 thereof. As shown in Figure 1, this seating area 26 lies between the undulations or in the recesses that form the exterior of the channeled passageway 14.

The practice of the invention has many advantages over the methods and baking utensils now employed commercially to make pre-baked pie shells. In the first place, the preparation of the dough is facilitated by the fact that the upper baking utensil when placed in position over the dough serves to trim it simultaneously. In the second place, the upper utensil is so constructed as to crimp a peripheral portion of the dough when the utensil is placed over the pie pan. In the third place, by constructing the upper baking utensil with a uniform cross-section, a uniform heat is supplied to the upper portion of the dough during the baking process. It will be understood that the upper utensil may be made of any suitable material such as cast aluminum. As will be readily recognized, the construction of the supplemental baking utensil by casting, molding or stamping is relatively simple. An important feature of the invention is that it permits the pie crust to be baked in an upright position, thereby avoiding the inconvenience and unsatisfactory results obtained by the use of inverted pie pans. A further feature of the invention resides in the fact that the supplemental baking utensil may be so constructed as to provide a space for expansion of the dough during baking. This is not ordinarily present when the pie shell is formed between a pair of inverted conventional pie pans. The invention makes it possible to produce a pre-baked pie shell having a crimped edge and an attractive appearance, something which has not been possible by the use of inverted superposed pie pans.

Having thus described the invention, what we claim as new and desire to secure by Letters Patent of the United States is:

1. A baking utensil adapted to nest in a pie pan, said utensil comprising a peripheral flange having a crimping channel therein forming a substantially enclosed crimping space with the rim of the pie pan when said utensil is nested in a pie pan, said channel having the general cross-sectional shape of an inverted U but with the inner leg of the inverted U varying continuously from an oblique position to a substantially vertical position with respect to the axis of the pie pan and vice versa.

2. A baking utensil adapted to nest in a pie pan, said utensil comprising a peripheral flange having a crimping channel therein forming an enclosed crimping space with the rim of the pie pan and providing a space between the rim of the pie pan and said channel adapted to crimp and form a raised bead on a sheet of dough enclosed therebetween, and seating means associated with said flange adapted to seat on top of the pie pan rim to hold said utensil and said pie pan in predetermined spaced relationship with a space therebetween forming a baking chamber.

3. A baking utensil adapted to nest in a pie pan, said utensil comprising a peripheral flange having a sinuous undulating channel therein forming an enclosure with the rim of the pie pan when said utensil is nested therein with recesses at intervals between the undulations of said channel and exterior thereto, and seating means across the bottom of said recesses for seating said flange on the rim of the pie pan in predetermined spaced relationship with the pie pan.

4. A baking utensil adapted to nest in a pie pan, said utensil comprising a peripheral flange having a channel therein forming an annular enclosed space with the rim of the pie pan when said utensil is nested therein, said channel being adapted to form a raised bead in said space on a sheet of dough enclosed between said baking utensil and said pie pan and a depending peripheral rim on said flange extending below the rim of the pie pan for trimming off excess dough.

LLOYD J. HARRISS.
BERNARD LAMBERS.